(12) United States Patent
Tashiro

(10) Patent No.: US 8,505,914 B2
(45) Date of Patent: Aug. 13, 2013

(54) ROLLER DEVICE AND IMAGE FORMING APPARATUS

(75) Inventor: Yoshiaki Tashiro, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/072,944

(22) Filed: Mar. 28, 2011

(65) Prior Publication Data

US 2011/0241290 A1 Oct. 6, 2011

(30) Foreign Application Priority Data

Mar. 31, 2010 (JP) ................. P2010-083357

(51) Int. Cl.
*B65H 5/00* (2006.01)
*F16C 33/02* (2006.01)

(52) U.S. Cl.
USPC .......................... 271/264; 384/301

(58) Field of Classification Search
USPC .............. 271/264; 384/301; 492/16, 18, 492/60
See application file for complete search history.

(56) References Cited

U.S. PATENT DOCUMENTS

| 1,454,682 | A | * | 5/1923 | Layne | 384/292 |
| 1,745,425 | A | * | 2/1930 | Johnson | 384/286 |
| 1,770,509 | A | * | 7/1930 | Chambers | 277/458 |
| 3,918,772 | A | * | 11/1975 | Van Damme | 384/29 |
| 4,728,088 | A | * | 3/1988 | Smith | 267/286 |
| 6,336,629 | B1 | * | 1/2002 | Carter et al. | 271/274 |
| 7,455,294 | B2 | * | 11/2008 | Lin et al. | 271/264 |
| 2007/0152398 | A1 | * | 7/2007 | Watanabe | 271/264 |

FOREIGN PATENT DOCUMENTS

| JP | 2003-160256 | 6/2003 |
| JP | 2006-193263 | 7/2006 |
| JP | 2009-227437 | 10/2009 |

* cited by examiner

*Primary Examiner* — Patrick Cicchino
(74) *Attorney, Agent, or Firm* — Ostrolenk Faber LLP

(57) ABSTRACT

A roller device includes a roller having a body and a pair of support shafts extending from both ends of the body; and a wire bearing made of a wire and having a pair of coils wound around each of the support shafts and a connection portion connecting the pair of coils.

22 Claims, 3 Drawing Sheets

ROLLER DEVICE AND IMAGE FORMING APPARATUS

BACKGROUND OF THE INVENTION

1. Field of the Invention

The present invention relates to a roller device and an image forming apparatus.

Priority is claimed on Japanese Patent Application No. 2010-083357, filed Mar. 31, 2010, the content of which is incorporated herein by reference.

2. Description of Related Art

In an image forming apparatus such as a printer or a copy machine, a plurality of pairs of rollers disposed to face each other are arranged along a transporting path so that a sheet of paper (a recording paper) is transported from a feeding tray (paper cassette) to a discharge tray (paper output tray). These rollers are called transporting rollers, resist rollers, discharge rollers, or the like in accordance with a place (an installation location) on the transporting path or an extrinsic function. However, one pair of rollers on the transporting path are driving rollers, and another pair of rollers on the transporting path are driven rollers, typically. That is, in the above rollers, the driving rollers actively rotate by means of a driving device such as a motor so that a paper is pinched and transported between one pair of driven rollers. In addition, in some image forming apparatuses, a single roller (a guide roller) for guiding a paper between the rollers may be disposed on the transporting path in order to decrease the friction between the paper and the transporting path.

SUMMARY OF THE INVENTION

However, the driven roller and the guide roller are resin mold products, which include a cylindrical body coming into contact with a paper and support shafts (rounded rod-shaped members) extending from both ends of the body. The driven roller and the guide roller may be supported rotatably while partly buried in a guide member (a resin mold product) that forms a transporting path. That is, the guide member has a retention region (an arched groove region) formed with dimensions slightly greater than those of the support shaft, so that the driven roller and the guide roller are rotatably supported by inserting the support shaft into the retention region.

However, since the support shaft and the retention region are press-fitted in a sliding contact state, a transporting function may be degraded due to abrasion of or damage to the support shaft. In particular, in a case where the driven roller and the guide roller are applied to an image forming apparatus (a high-speed device) in which a paper is transported at a high speed, the support shaft may be easily worn or damaged, which may more easily degrade the transporting function.

In addition, it may be construed that the above problem can be easily solved if a sliding resistance is decreased by adopting a bearing such as a ball bearing for the driven roller and the guide roller. However, in an image forming apparatus, due to the narrow space of the transporting path and cost-related demands, it is not easy to adopt a general bearing for the driven roller and the guide roller.

The present invention is achieved in consideration of the above problems, and an object of the invention is to decrease a sliding resistance of a roller by using a simple structure.

In order to accomplish the above object, the invention uses the following methods.

According to an aspect of the present invention, a roller device includes a roller having a body and a pair of support shafts respectively extending from both ends of the body; and a wire bearing made of a wire and having a pair of coils wound around each of the support shafts and a connection portion connecting the pair of coils.

According to the present invention, the roller device includes a roller having a body and a pair of support shafts respectively extending from both ends of the body, and a wire bearing made of a wire and having a pair of coils wound around each of the support shafts and a connection portion connecting the pair of coils. In other words, according to the present invention, since the wire bearing having a wire is added to the roller, it is possible to decrease the sliding resistance of the roller using a simple structure.

DETAILED DESCRIPTION OF THE INVENTION

Hereinafter, an embodiment of the present invention will be described with reference to the drawings.

Figure 1:
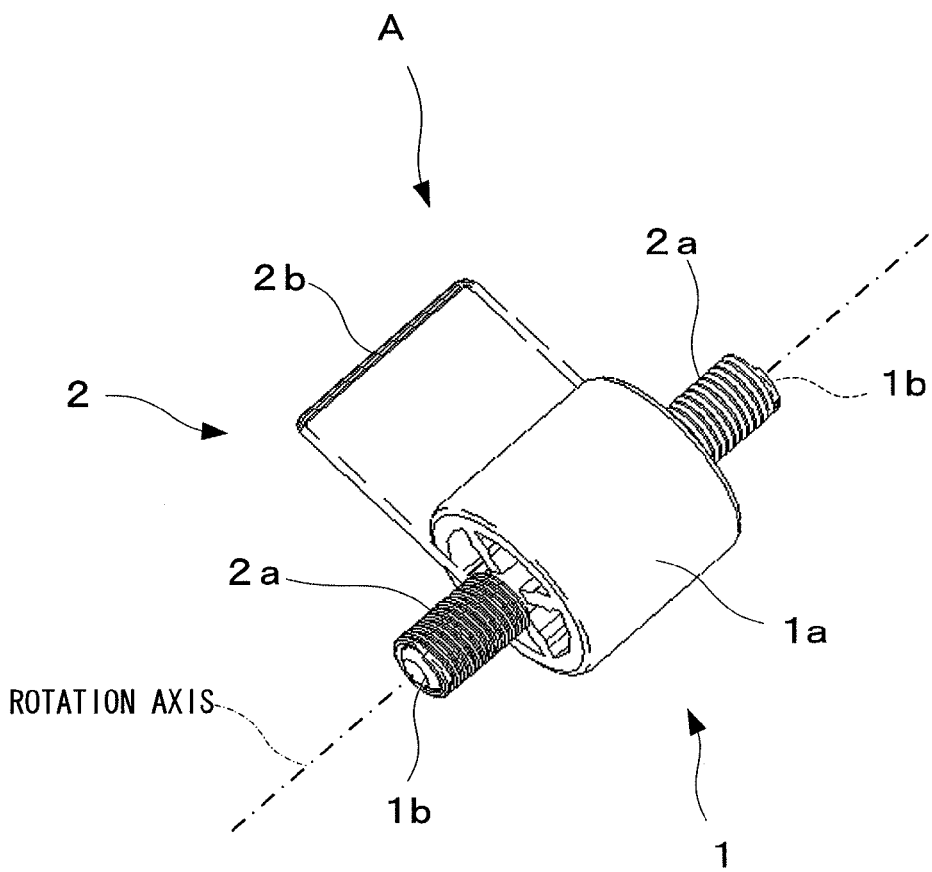
FIG. 1 is a perspective view showing a structure of a guide roller A according to an embodiment of the present invention.

A guide roller A according to the embodiment includes a roller 1 and a wire bearing 2, as shown in FIG. 1. The guide roller A is solely installed between transporting rollers (rollers for carrying a paper by a pair of a driving roller and a driven roller) disposed at a transporting path of an image forming apparatus to guide a paper (a recording paper) in order to decrease the friction between the paper and the transporting path. That is, the guide roller A functions with only one roller, without having a roller (a pair of rollers) opposite to the guide roller A.

The roller 1 is a resin mold product having a body 1*a* and a pair of support shafts 1*b*. The body 1*a* is a cylindrical member coming into contact with the paper. The support shafts 1*b* are rounded rod-shaped members respectively extending from both ends of the body 1*a*. The roller 1 rotates around a rotation axis represented by a dot-dash line.

The wire bearing 2 is a wire product having a coil 2*a* and a connection portion 2*b*, and the wire bearing 2 is a distinctive component of the guide roller A of this embodiment. The wire bearing 2 is made of one continuous wire. In addition, one wire also includes a wire material in which a plurality of wires are integrated by means of adhesion using an adhesive or the like. The coil 2*a* is a wire portion formed by winding a wire around each support shaft 1*b*. In more detail, the coil 2*a* is formed simply by winding a wire into one layer not to be overlapped in a radial direction (in other words, a single-layered winding) so that wire portions adjacent to each other are contacted without any gap along the rotation axis (in other words, forming a close winding).

The coil 2*a* has an inner diameter slightly greater than an axial diameter of the support shaft 1*b* so that the support shaft 1*b* inserted into the coil 2*a* may freely rotate with respect to the coil 2*a*. In addition, in each coil 2*a*, as shown in FIG. 1, each end of the wire (corresponding to each of both ends of the wire bearing 2) is located at a tip end (opposite to an end at which the support shaft 1*b* connects to the body 1*a*) of the support shaft 1*b*. In other words, the wire bearing 2 is formed by winding (processing) the wire so that each end of the wire is located at the tip end side of the support shaft. The connection portion 2b is a wire portion that connects a pair of these coils 2a with each other and functions as a rotation stopper of the coil 2a. As shown in FIG. 1, the connection portion 2b is a wire portion having a pair of parallel portions extending from the end of each coil 2a in a radial direction of each coil 2a, and a connection portion for connecting one set of ends of the parallel portions, so that the wire is bent into a U shape.

In addition, the shape of the connection portion 2b is not limited to the U shape, and the connection portion 2b may have, for example, an arc shape. As mentioned above, the shape of the connection portion 2b is not specially limited as long as it connects the pair of coils 2a and functions as a rotation stopper of the coil 2a. The wire used for the wire bearing 2 is a metal having elasticity, for example a hard steel wire, a piano wire, or a stainless steel wire used as a material of coil springs. In addition, the wire may be a round wire or a square wire, and a round wire having a small contact area is desirable so as to reduce friction.

Figure 2:
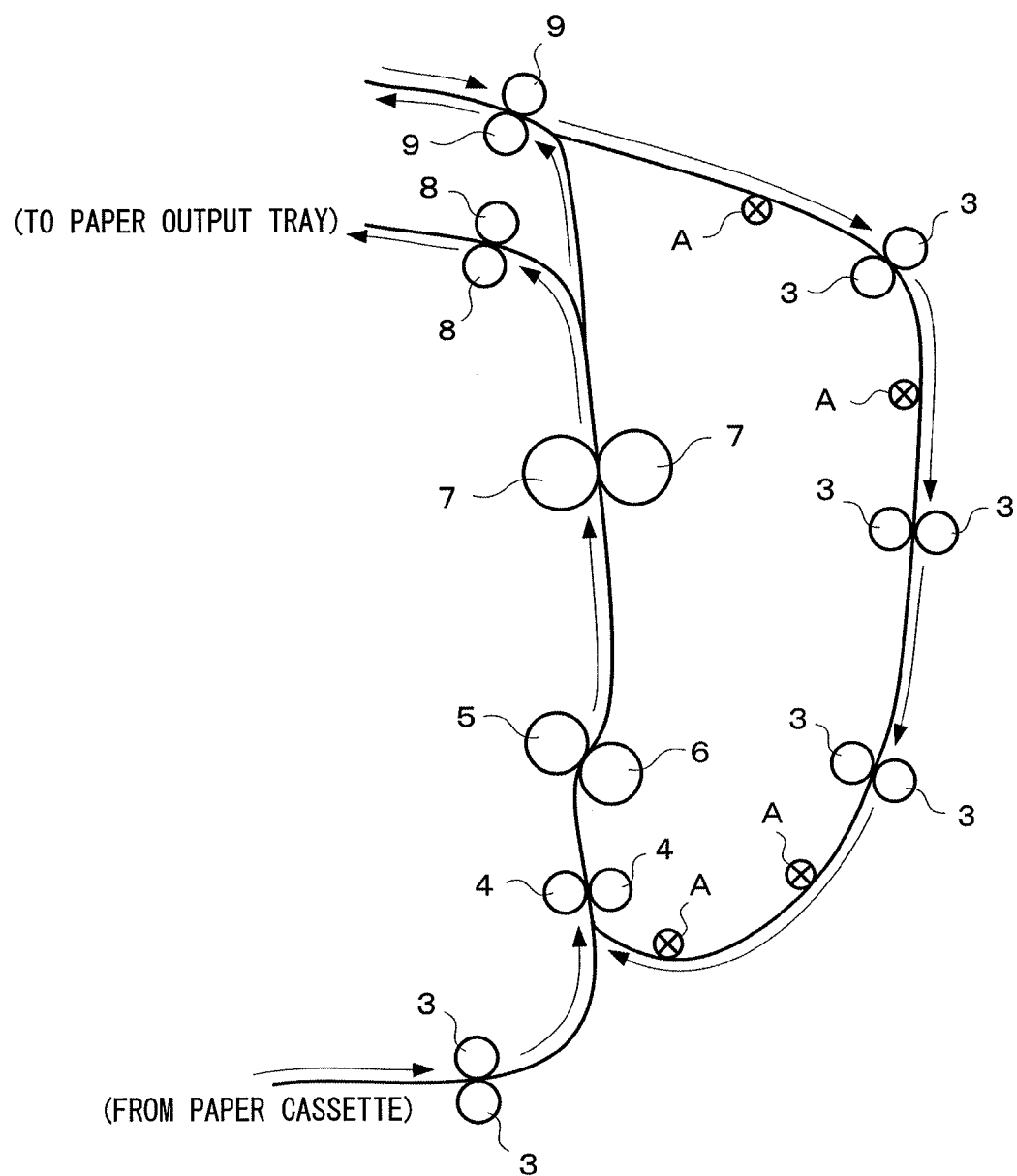
FIG. 2 is a schematic view showing a transporting path of an image forming apparatus according to an embodiment of the present invention.

An image forming apparatus to which the guide roller A is installed has a transporting path as shown in FIG. 2. In the transporting path, carrying rollers 3, resist rollers 4, a photosensitive drum 5, a transfer roller 6, fuser rollers 7, first discharge rollers 8, second discharge rollers 9, and guide rollers A are provided.

The carrying rollers 3 are separately disposed at essential points of the transporting path and have a driving roller and a driven roller. The resist rollers 4 are rollers for controlling the timing of supplying a paper to the photosensitive drum 5 for the purpose of forming an image, and the resist rollers 4 have a driving roller and a driven roller, like the carrying rollers 3. As shown by an arrow in FIG. 2, the resist rollers 4 supplies a paper drawn from a paper cassette to the photosensitive drum 5.

The photosensitive drum 5 is a kind of driving roller made of a predetermined photosensitive material and forming a toner image on a surface (a peripheral surface) thereof by means of exposure and development. The transfer roller 6 is a driving roller used while making a pair with the photosensitive drum 5, and in order to transfer the toner image onto a paper, transports the paper to the fuser rollers 7 while pressing the paper against the photosensitive drum 5. The fuser rollers 7 are a pair of rollers having a heating roller and a pressing roller, and the fuser rollers 7 enable the toner image to be transferred onto the paper so as to be strictly fixed to the paper by applying heat and pressure and also transport the paper to the first discharge rollers 8 or the second discharge rollers 9.

The first discharge rollers 8 have a driving roller and a driven roller and discharge a paper on which an image forming is completed to a first discharge tray. The second discharge rollers 9 have a driving roller and a driven roller and discharge a paper on which an image forming is completed to a second discharge tray. In addition, a distribution mechanism, not shown, is installed on the transporting path at a paper outlet side of the fuser rollers 7, so that the distribution mechanism distributes a paper in which fixing is completed by the fuser rollers 7 to the first discharge rollers 8 or the second discharge rollers 9, selectively.

In a case where an image is formed on one surface of a paper (single-sided printing), as described above, the paper is transported on the transporting path along a common route in the order of the carrying rollers 3, the resist rollers 4, the photosensitive drum 5 (the transfer roller 6), the fusing rollers 7, and the first discharge rollers 8 or the second discharge rollers 9. Meanwhile, in a case where both surfaces of a paper are printed, the second discharge rollers 9 are reversely rotated while the paper is transported, so that the paper reaching the second discharge rollers 9 is passed along a returning route diverged from the common route to be transported to the resist rollers 4 again. The paper transported to the resist rollers 4 again via the returning route has reversed its inside and outside in comparison to the case when the paper was initially transported (when the paper passes through the resist rollers 4 for the first time).

Figure 3:
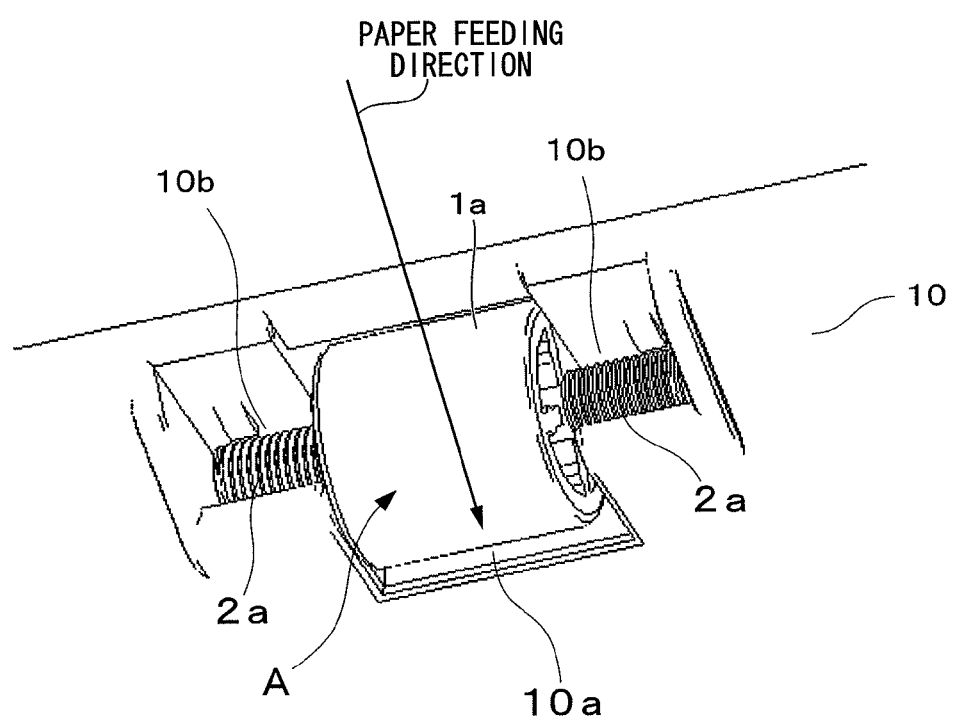
FIG. 3 is a perspective view showing a mounted state of the guide roller A to the transporting path of the image forming apparatus according to an embodiment of the present invention.

In the returning route, as shown in FIG. 2, a plurality of transporting rollers 3 and a plurality of guide rollers A are arranged. The guide rollers A are, as shown in FIG. 3, supported while being partially buried in a guide member 10 (a guide plate) that forms the transporting path, such that the roller 1 is freely rotatable. In other words, the guide member 10 includes a roller housing portion 10a partially housing the body 1a of the guide rollers A, and shaft holding portions 10b disposed at both sides of the roller housing portion 10a and having a channel having substantially the same shape as a side (a peripheral surface) of the coil 2a of the guide rollers A. As shown in FIG. 3, the guide rollers A is supported by the guide member 10 by inserting a pair of coils 2a located at both sides of the body 1a into the shaft holding portions 10b. The guide member 10 is a resin mold product having flexibility to some extent.

Here, the connection portion 2b of the guide rollers A is housed in the roller housing portion 10a to be held. However, if necessary, a hooking portion may be provided on the transporting path separately from the roller housing portion 10a so that the connection portion 2b is fixed to the hooking portion. In addition, in a case where the connection portion 2b is hooked and fixed to the hooking portion, it is desirable that the hooking portion is provided downstream of the guide rollers A in a paper feeding direction. If the hooking portion is provided upstream of the guide rollers A, the connection portion 2b may come off from the hooking portion.

Next, effects of the guide rollers A and the image forming apparatus configured as above will be described.

In the guide rollers A according to this embodiment, one pair of support shafts 1b of the roller 1 is supported by the guide member 10 via the coils 2a. In other words, a pair of coils 2a into which the support shaft 1b is inserted has a simple structure in which a wire is wound into a coil shape, but the coils 2a function as a bearing.

That is, the guide rollers A of this embodiment can reduce the sliding resistance in comparison with a case where the support shaft is directly supported by the guide member as in the conventional case, and thus the support shaft 1b is less worn or damaged than the conventional cases. As a result, the deterioration of the transporting function may be suppressed to a greater extent than in conventional cases.

Moreover, in the guide roller A of this embodiment, a pair of coils 2a is connected by means of the connection portion 2b. For example, it may be conceived that the connection portion 2b is excluded so that the pair of coils 2a is used as a single component. However, in this case, the guide rollers have three independent parts, and thus the guide rollers may not be easily handled as parts. In the guide rollers A of this embodiment, since a pair of coils 2a is connected by means of the connection portion 2b having elasticity, each coil 2a may be easily mounted to each support shaft 1b, and also each support shaft 1b may be maintained while being inserted into each coil 2a. Thus, the guide rollers A may be handled as a single part, so that the guide rollers A of this embodiment may be easily handled.

In addition, since the coil 2a is closely wound, it is possible to suppress the movement of the body 1a in an axial direction of the rotation axis. If the coil 2a is not closely wound but wound with a gap between adjacent wires, the body 1a may easily move in the axial direction of the rotation axis due to the existence of the gap.

Further, though the wire bearing 2 is made of a metal wire, an abrasion-resistant coating may be applied to the surface of the metal wire in order to improve the abrasion resistance. Moreover, though the roller device of the present invention is applied to a guide roller in the above embodiment, the roller device of the present invention may also be applied to a driven roller, in addition to the guide roller.

As described above, by using present the invention, it is possible to provide a roller device and an image forming apparatus, in which the sliding resistance of the roller is reduced by means of a simple structure.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A roller device comprising:
   a roller having a body and a pair of support shafts extending from both ends of the body, the roller rotating around a rotation axis; and
   a wire bearing made of a wire and having a pair of spiral coils of wire wound around each of the support shafts so that adjacent wire portions of a coil contact each other without any gap in a direction of the rotation axis and a connection portion connecting the pair of spiral coils,
   wherein the roller device is supported by a guide member having at least a shaft holding portion for supporting the pair of spiral coils, and the pair of spiral coils is inserted into the shaft holding portions so that the roller device is supported by the guide member.

2. The roller device according to claim 1, wherein, in the pair of spiral coils, each end of the wire is located at a tip end side of each of the support shafts.

3. The roller device according to claim 1, wherein the wire is a metal wire having elasticity.

4. The roller device according to claim 1, wherein, in the spiral coil, the wire is closely wound.

5. An image forming apparatus comprising the roller device according to the claim 1 which is installed on a transporting path of a recording paper.

6. The image forming apparatus according to claim 5, wherein the roller device is a guide roller solely disposed on the transporting path to reduce friction between the recording paper and the transporting path.

7. The image forming apparatus according to claim 6, wherein the roller device is supported by the guide member so that the roller is rotatable, the guide member further having a roller housing portion for housing the body.

8. The roller device according to claim 1, wherein each end of the connection portion is located at a base end side of each of the support shafts.

9. The roller device according to claim 1, wherein the pair of spiral coils is formed from a plurality of wire turns.

10. The roller device according to claim 1, wherein the pair of spiral coils is substantially wound from a tip end to a base end of each of the support shafts.

11. A roller device comprising:
    a roller having a body and a pair of support shafts extending from both ends of the body; and
    a wire bearing made of a wire and having a pair of spiral coils wound around each of the support shafts and a connection portion connecting the pair of spiral coils,
    wherein the roller device is supported by a guide member having at least a shaft holding portion for supporting the pair of spiral coils, and the pair of spiral coils is inserted into the shaft holding portions so that the roller device is supported by the guide member.

12. An image forming apparatus comprising a roller device which includes:
    a roller having a body and a pair of support shafts extending from both ends of the body; and
    a wire bearing made of a wire and having a pair of spiral coils wound around each of the support shafts and a connection portion connecting the pair of spiral coils,
    wherein the roller device is supported by a guide member having at least a shaft holding portion for supporting the pair of spiral coils, and the pair of spiral coils is inserted into the shaft holding portions so that the roller device is supported by the guide member.

13. The image forming apparatus according to claim 12, wherein, in the pair of spiral coils, each end of the wire is located at a tip end side of each of the support shafts.

14. The image forming apparatus according to claim 12, wherein the wire is a metal wire having elasticity.

15. The image forming apparatus according to claim 12, wherein, in the spiral coil, the wire is closely wound.

16. An image forming apparatus according to claim 12, wherein the roller device is installed on a transporting path of a recording paper.

17. The image forming apparatus according to claim 16, wherein the roller device is a guide roller solely disposed on the transporting path to reduce friction between the recording paper and the transporting path.

18. The image forming apparatus according to claim 17, wherein the roller device is supported by the guide member so that the roller is rotatable, the guide member further having a roller housing portion for housing the body.

19. The image forming apparatus according to claim 12, wherein each end of the connection portion is located at a base end side of each of the support shafts.

20. The image forming apparatus according to claim 12, wherein the pair of spiral coils is formed from a plurality of wire turns.

21. The image forming apparatus according to claim 12, wherein the pair of spiral coils is substantially wound from a tip end to a base end of each of the support shafts.

22. An image forming apparatus according to claim 12, comprising a paper transporting apparatus which includes the roller device.

* * * * *